(12) United States Patent
Shibutani et al.

(10) Patent No.: US 9,993,979 B2
(45) Date of Patent: Jun. 12, 2018

(54) DEVICE FOR AUTOMATICALLY LAYERING PREPREG SHEETS AND METHOD FOR LAYERING PREPREG SHEETS

(71) Applicant: MITSUBISHI HEAVY INDUSTRIES, LTD., Tokyo (JP)

(72) Inventors: Takashi Shibutani, Tokyo (JP); Megumu Tsuruta, Tokyo (JP); Kosuke Owatari, Tokyo (JP); Toshikazu Ueda, Tokyo (JP); Yukiharu Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 119 days.

(21) Appl. No.: 15/026,489

(22) PCT Filed: Nov. 5, 2014

(86) PCT No.: PCT/JP2014/079355
§ 371 (c)(1),
(2) Date: Mar. 31, 2016

(87) PCT Pub. No.: WO2015/068734
PCT Pub. Date: May 14, 2015

(65) Prior Publication Data
US 2016/0243769 A1 Aug. 25, 2016

(30) Foreign Application Priority Data
Nov. 6, 2013 (JP) .................................. 2013-230373

(51) Int. Cl.
*B29C 33/68* (2006.01)
*B29C 35/02* (2006.01)
(Continued)

(52) U.S. Cl.
CPC ............ *B29C 70/386* (2013.01); *B29C 33/68* (2013.01); *B29C 35/02* (2013.01); *B29C 35/16* (2013.01);
(Continued)

(58) Field of Classification Search
USPC .......... 156/249, 289, 308.2, 309.9, 701, 711, 156/498, 499, 537, 540, 543, 750, 752
See application file for complete search history.

(56) References Cited

U.S. PATENT DOCUMENTS 5,201,979 A * 4/1993 Koba .................... B29C 70/504
100/212
5,397,415 A * 3/1995 Manabe .................. B26D 3/08
156/234
2012/0227907 A1 9/2012 Arakawa et al.

FOREIGN PATENT DOCUMENTS

CN 1698403 A 11/2005
CN 101511566 A 8/2009
(Continued)

OTHER PUBLICATIONS

PCT/ISA/210, "International Search Report for International Application No. PCT/JP2014/079355," dated Jan. 13, 2015.
(Continued)

*Primary Examiner* — Sing P Chan
(74) *Attorney, Agent, or Firm* — Manabu Kanesaka; Benjamin Hauptman; Kenneth Berner

(57) ABSTRACT

The present invention has a cooling unit (29) as a temperature gradient formation unit for forming a temperature gradient in which the temperature is lowered in the direction from one surface (18*a*) of a semi-cured prepreg sheet (18) layered on a top surface (12*a*) of a layered body (12) toward the other surface (17*b*) of a release sheet (17), in a first region (C1) of a layered sheet (16) located upstream from a first roller (52).

11 Claims, 3 Drawing Sheets

(51) Int. Cl.
    *B29C 35/16* (2006.01)
    *B29C 70/06* (2006.01)
    *B29C 70/38* (2006.01)
    *B29K 101/10* (2006.01)
    *B29K 105/08* (2006.01)
    *B29L 31/30* (2006.01)

(52) U.S. Cl.
    CPC ............ *B29C 70/06* (2013.01); *B29C 70/388* (2013.01); *B29C 2035/1658* (2013.01); *B29K 2101/10* (2013.01); *B29K 2105/0872* (2013.01); *B29L 2031/3082* (2013.01); *B29L 2031/3085* (2013.01)

(56) References Cited

FOREIGN PATENT DOCUMENTS

| | | |
|---|---|---|
| CN | 102776299 A | 11/2012 |
| EP | 1547753 A1 | 6/2005 |
| JP | H05-269881 A | 10/1993 |
| JP | H10-272896 A | 10/1998 |
| JP | 2005-297513 A | 10/2005 |
| JP | 2005-329593 A | 12/2005 |
| JP | 2006-281548 A | 10/2006 |
| JP | 2007-503329 A | 2/2007 |
| JP | 2008-238809 A | 10/2008 |
| JP | 2011-177927 A | 9/2011 |
| JP | 2011-177939 A | 9/2011 |
| WO | 2007/013543 A1 | 2/2007 |

OTHER PUBLICATIONS

PCT/ISA/237, "Written Opinion of the International Searching Authority for International Application No. PCT/JP2014/079355," dated Jan. 13, 2015.
Europe Patent Office, "Search Report for European Patent Application No. 14860804.5," dated Oct. 4, 2016.
China Patent Office, "Office Action for Chinese Patent Application No. 201480055558.8," dated Dec. 26, 2016.

* cited by examiner

DEVICE FOR AUTOMATICALLY LAYERING PREPREG SHEETS AND METHOD FOR LAYERING PREPREG SHEETS

TECHNICAL FIELD

The present invention relates to a device for automatically layering prepreg sheets and a method for layering prepreg sheets which manufacture prepreg layered bodies formed by layering a plurality of semi-cured prepreg sheets, each of the semi-cured prepreg sheets being formed of a fiber sheet impregnated with resin.

This application claims priority based on Japanese Patent Application No. 2013-230373 filed in Japan on Nov. 6, 2013, of which the contents are incorporated herein by reference.

BACKGROUND ART

Conventionally, aircraft fuselages, main wings, and the like are manufactured using completely cured prepreg layered bodies. The completely cured prepreg layered bodies are each formed by layering a plurality of prepreg sheets (FRP sheets), each of the prepreg sheets being formed of a fiber sheet impregnated with resin, to form a semi-cured (incompletely cured) prepreg layered body and then completely curing the semi-cured prepreg layered body.

The fibers forming the fiber sheet described above extend in the same fiber direction. In addition, the fiber sheet has adhesiveness because an ultraviolet curable resin, a thermosetting resin, or the like in a semi-cured state (incompletely cured state) is used as the resin with which the fiber sheet is impregnated. For this reason, a release sheet is arranged on one surface of the prepreg sheet.

The prepreg layered body in the semi-cured state described above is formed using a device for automatically layering prepreg sheets. Specifically, the device for automatically layering prepreg sheets forms a semi-cured prepreg layered body by removing the release sheet from the semi-cured prepreg sheet and integrally layering a plurality of the prepreg sheets while the fiber directions of the fiber sheets are made to intersect each other.

At this time, if air (air pockets) remains between the layered, semi-cured prepreg sheets, the adhesion between the prepreg sheets may decrease.

In addition, when the above-described semi-cured prepreg layered bodies in which the air remains are completely cured, for example, using heat (in this case, the resin forming the prepreg sheet is a thermosetting resin), the air (the air pockets) expands, which could lead to a further decrease in the adhesion between the prepreg sheets.

Therefore, conventionally, air (air pockets) is prevented from remaining between layered, semi-cured prepreg sheets by press-bonding the semi-cured prepreg sheets using a compactor (one of the constituent components of the device for automatically layering prepreg sheets) including a piston mechanism.

However, if the release sheet is insufficiently peeled off from the semi-cured prepreg sheet, the semi-cured prepreg sheets may be pulled by the release sheet such that the prepreg layered body (in other words, a layered body formed of one or more semi-cured prepreg sheets), which is in a semi-cured state under manufacturing floats up, or such that the position of the layered body is shifted from a predetermined position.

In addition, in a case of using a compactor including a piston mechanism, when there is a layered surface in which the crimping between the semi-cured prepreg sheets is insufficient, there is a possibility that the position of the above-described semi-cured prepreg layered body (layered body) during the manufacturing will be shifted from a predetermined position due to the translational driving force of the compactor.

Conventionally, in a case where the semi-cured prepreg layered body (layered body) is misaligned under manufacturing, the prepreg layered body (layered body) which has been misaligned under manufacturing is removed manually and the semi-cured prepreg sheet layering process is performed again. For this reason, the productivity of the semi-cured prepreg layered body is decreased.

For this reason, there is a demand for a technique which, by facilitating the peeling off of the release sheet from the semi-cured prepreg sheet, can suppress the misalignment of the semi-cured prepreg layered body (layered body) under manufacturing and improve the adhesion between the layered, semi-cured prepreg sheets.

For example, Patent Document 1 describes a conventional technique which can improve the adhesion between the semi-cured prepreg sheets.

Patent Document 1 discloses a technique in which a prepreg material (prepreg sheet) is fed and taken out from a cartridge, the tackiness (adhesiveness) is improved by heating through contact with a heated compaction roller, and the prepreg material is pressed and layered on a forming jig by the compaction roller.

CITATION LIST

Patent Literature

Patent Document 1: Japanese Unexamined Patent Application Publication No. 2006-281548A

SUMMARY OF INVENTION

Technical Problem

With the technique disclosed in Patent Document 1, the adhesive force between the layered prepreg materials (prepreg sheets) can be improved; however, it is harder to peel off the release sheet from the prepreg material since the adhesive force between the release sheet and the prepreg material is also improved.

Due to this, the semi-cured prepreg layered body (layered body) under manufacturing is misaligned with respect to a predetermined position, which may decrease the productivity of the semi-cured prepreg layered body.

The present invention provides a device for automatically layering prepreg sheets and a method for layering prepreg sheets which are able to improve the productivity of a semi-cured prepreg layered body by suppressing the misalignment of the semi-cured prepreg layered body (layered body) under manufacturing.

Solution to Problem

According to a first aspect of the present invention, a device for automatically layering prepreg sheets forms a prepreg layered body by layering a plurality of semi-cured prepreg sheets, each of the semi-cured prepreg sheets being formed of a fiber sheet impregnated with resin. The device for automatically layering prepreg sheets includes a first roller which presses a layered sheet including a release sheet and the semi-cured prepreg sheet attached to one surface of the release sheet, from the other surface of the release sheet so as to layer the semi-cured prepreg sheet forming the layered sheet on the top surface of a layered body formed of one or more layers of semi-cured prepreg sheets, a second roller arranged downstream from the first roller, the second roller guiding the release sheet in a direction in which the release sheet is peeled off from the semi-cured prepreg sheet layered on the top surface of the layered body, and a temperature gradient formation unit which forms a temperature gradient in a predetermined region of the layered sheet located upstream from the first roller such that the temperature is lowered in a direction from one surface of the semi-cured prepreg sheet layered on the top surface of the layered body toward the other surface of the release sheet.

According to the aspect described above, the device includes the temperature gradient formation unit which forms a temperature gradient in the predetermined region of the layered sheet located upstream from the first roller such that the temperature is lowered in the direction from the one surface of the semi-cured prepreg sheet layered on the top surface of the layered body toward the other surface of the release sheet. This makes it possible to suppress a temperature decrease on the one surface side of the semi-cured prepreg sheet and to decrease the temperature in the vicinity of the interface between the other surface of the semi-cured prepreg sheet and the one surface of the release sheet.

This also makes it possible to suppress a decrease in the adhesive force of the one surface of the semi-cured prepreg sheet and to easily peel off the release sheet from the semi-cured prepreg sheet.

Accordingly, it is possible to suppress the misalignment of the layered body (in other words, of the semi-cured prepreg layered body under manufacturing) due to the poor releasability of the release sheet. Therefore, the productivity of the semi-cured prepreg layered body can be improved.

In addition, forming the above-described temperature gradient in a portion corresponding to the predetermined region of the layered sheet makes it possible to further suppress the misalignment of the layered body due to the poor releasability of the release sheet in comparison with a case where, for example, the temperature gradient is formed in the layered sheet by line contact using a roller.

In the device for automatically layering prepreg sheets according to the aspect described above, the predetermined region may include a first region, and the temperature gradient formation unit may be a cooling unit which cools the release sheet from the other surface side of the release sheet located in the first region.

In this manner, the temperature is lowered on the other surface side of the release sheet using a cooling unit, which cools the release sheet from the other surface side of the release sheet located in the first region of the predetermined region, as the temperature gradient formation unit. Therefore, it is possible to form a temperature gradient in which the temperature is lowered in a direction from the one surface of the semi-cured prepreg sheet toward the other surface of the release sheet.

In the device for automatically layering prepreg sheets according to the aspect described above, the cooling unit may blow cold air to the other surface of the release sheet located in the first region.

In this manner, in addition to suppressing the generation of condensation on the other surface of the release sheet, providing the cooling unit blowing cold air to the other surface of the release sheet located in the first region makes it possible to form a temperature gradient in which the temperature is lowered in a direction from one surface of the semi-cured prepreg sheet toward the other surface of the release sheet.

In the device for automatically layering prepreg sheets according to the aspect described above, the predetermined region may include a second region located upstream from the first region, and a first heating unit may be included which heats the semi-cured prepreg sheet from the one surface side of the semi-cured prepreg sheet located in the second region.

In this manner, providing the first heating unit which heats the semi-cured prepreg sheet from the one surface side of the semi-cured prepreg sheet located in the second region arranged upstream from the first region makes it possible to form a temperature gradient in which the temperature is lowered in a direction from one surface of the semi-cured prepreg sheet toward the other surface of the release sheet.

Furthermore, providing the cooling unit and the first heating unit that form a temperature gradient in which the temperature is lowered in a direction from one surface of the semi-cured prepreg sheet toward the other surface of the release sheet makes it possible to improve the adhesive force between the top surface of the layered body and one surface of the semi-cured prepreg sheet.

In the device for automatically layering prepreg sheets according to the aspect described above, a second heating unit which heats the layered body located upstream from the first roller may be included.

In this manner, providing the second heating unit which heats the layered body located upstream from the first roller makes it possible to improve the adhesive force between the top surface of the layered body and the one surface of the semi-cured prepreg sheet.

According to a second aspect of the present invention, there is provided a method for layering prepreg sheets in which a prepreg layered body is formed by layering a plurality of semi-cured prepreg sheets, each of the semi-cured prepreg sheets being formed of a fiber sheet impregnated with resin. The method for layering prepreg sheets includes a layering step of pressing a layered sheet including a release sheet and the semi-cured prepreg sheet attached to one surface of the release sheet, from the other surface of the release sheet with a first roller so as to layer the semi-cured prepreg sheet forming the layered sheet on the top surface of a layered body formed of one or more layers of semi-cured prepreg sheets, a peeling-off step of peeling off the release sheet from the semi-cured prepreg sheet layered on the top surface of the layered body with a second roller arranged downstream from the first roller after the layering step, and a temperature gradient formation step of forming a temperature gradient in a predetermined region of the layered sheet located upstream from the first roller such that the temperature is lowered in a direction from one surface of the semi-cured prepreg sheet layered on the top surface of the layered body toward the other surface of the release sheet before the layering step.

According to the aspect described above, before the layering step, a temperature gradient is formed in the predetermined region of the layered sheet located upstream from the first roller such that the temperature is lowered in the direction from the one surface of the semi-cured prepreg sheet layered on the top surface of the layered body toward the other surface of the release sheet. This makes it possible to suppress a temperature decrease on the one surface side of the semi-cured prepreg sheet and to decrease the temperature in the vicinity of the interface between the other surface of the semi-cured prepreg sheet and the one surface of the release sheet.

This also makes it possible to suppress a decrease in the adhesive force of the one surface of the semi-cured prepreg sheet and to easily peel off the release sheet from the semi-cured prepreg sheet.

Accordingly, the productivity of the semi-cured prepreg layered body can be improved since it is possible to suppress the misalignment of the layered body (in other words, of the semi-cured prepreg layered body under manufacturing) due to the poor releasability of the release sheet.

In addition, forming the above-described temperature gradient in a portion corresponding to the predetermined region of the layered sheet makes it possible to further suppress the misalignment of the layered body due to the poor releasability of the release sheet in comparison with a case where, for example, the temperature gradient is formed in the layered sheet by line contact using a roller.

In the method for layering prepreg sheets according to the aspect described above, in the temperature gradient formation step, the release sheet located in the first region of the predetermined region is cooled from the other surface side of the release sheet.

In this manner, in the temperature gradient formation step, since the temperature is lowered on the other surface side of the release sheet by cooling the release sheet located in the first region of the predetermined region from the other surface side of the release sheet, it is possible to form a temperature gradient in which the temperature is lowered in a direction from one surface of the semi-cured prepreg sheet toward the other surface of the release sheet.

In the method for layering prepreg sheets according to the aspect described above, in the temperature gradient formation step, cold air may be blown to the other surface of the release sheet located in the first region.

In this manner, in the temperature gradient formation step, in addition to suppressing the generation of condensation on the other surface of the release sheet, blowing cold air to the other surface of the release sheet located in the first region makes it possible to form a temperature gradient in which the temperature is lowered in a direction from one surface of the semi-cured prepreg sheet toward the other surface of the release sheet.

In the method for layering prepreg sheets according to the aspect described above, in the temperature gradient formation step, the semi-cured prepreg sheet located in a second region arranged upstream from the first region of the predetermined region is heated from the one surface side of the semi-cured prepreg sheet.

In this manner, in the temperature gradient formation step, heating the semi-cured prepreg sheet located in the second region arranged upstream from the first region of the predetermined region from the one surface side of the semi-cured prepreg sheet makes it possible to form a temperature gradient in which the temperature is lowered in a direction from one surface of the semi-cured prepreg sheet toward the other surface of the release sheet.

In the method for layering prepreg sheets according to the aspect described above, in the temperature gradient formation step, the layered body located upstream from the first roller may be heated.

In this manner, in the temperature gradient formation step, heating the layered body located upstream from the first roller makes it possible to improve the adhesive force between the top surface of the layered body and the one surface of the semi-cured prepreg sheet.

Advantageous Effect of Invention

According to the device for automatically layering prepreg sheets and the method for layering prepreg sheets described above, suppressing the misalignment of the semi-cured prepreg layered body (layered body) under manufacturing makes it possible to improve the productivity of the semi-cured prepreg layered body.

DESCRIPTION OF EMBODIMENTS

The following describes in detail embodiments of the present invention, with reference to the drawings. Here, the drawings used in the following description are for illustrating the configuration of the embodiments of the present invention and, in terms of the size, thickness, dimensions, and the like of each illustrated part, the actual dimensional relationships in the device for automatically layering prepreg sheets may be different.

First Embodiment

Figure 1:
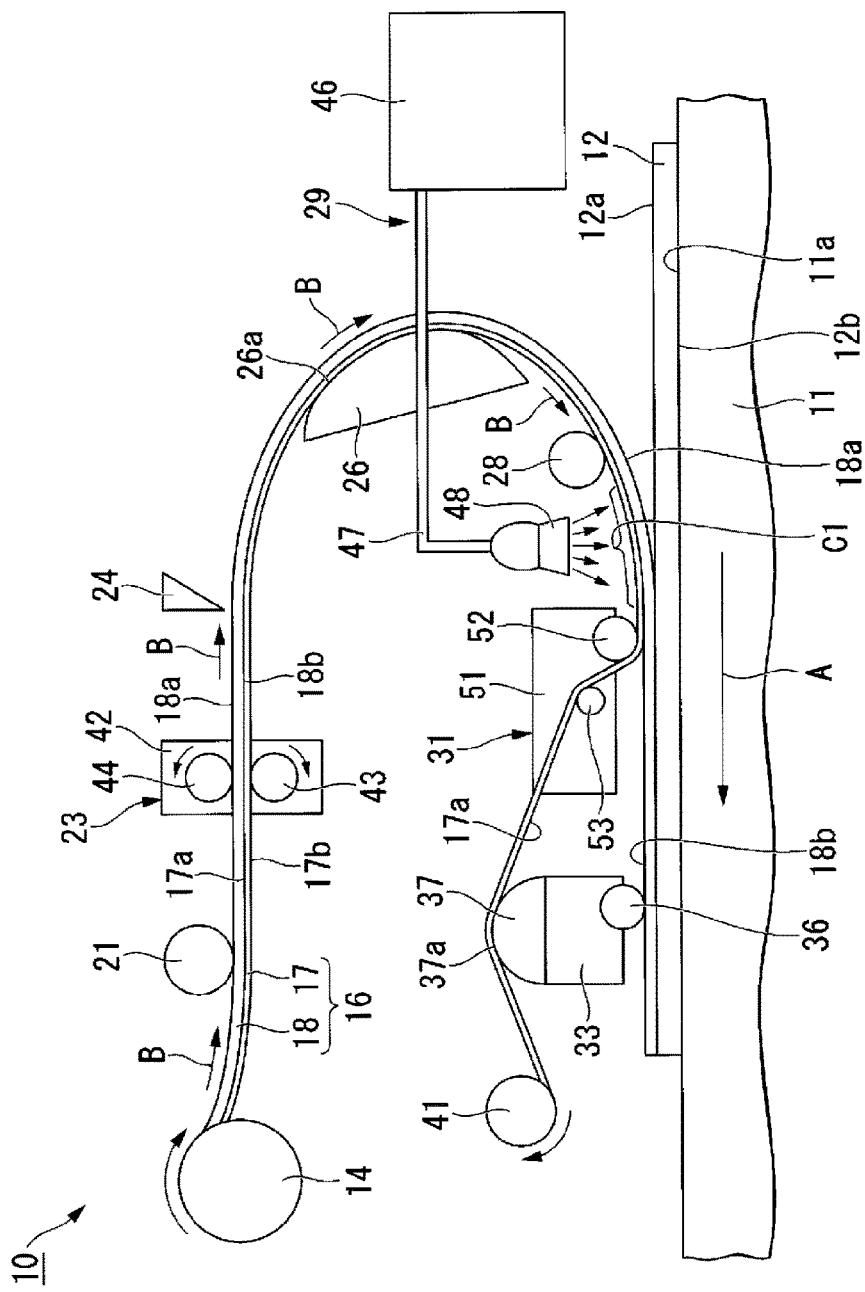
FIG. 1 is a diagram schematically illustrating an outline configuration of a device for automatically layering prepreg sheets according to a first embodiment of the present invention.

FIG. 1 is a diagram schematically illustrating an outline configuration of a device for automatically layering prepreg sheets according to a first embodiment of the present invention. FIG. 1 schematically illustrates a state in which a semi-cured prepreg sheet 18 forming a layered sheet 16 is layered on a top surface 12a of a layered body 12 put on a stage 11.

A in FIG. 1 indicates the movement direction (referred to below as the "A direction") of the stage 11 during execution of a prepreg sheet layering process illustrated in FIG. 1. B in FIG. 1 indicates the feeding direction (referred to below as the "feeding direction B") of the layered sheet 16. C1 indicates a first region (referred to below as "first region C1") cooled by a cooling unit 29 in the predetermined region.

In addition, the first region C1 indicates a region located between a first roller 52 and a second guide roller 28.

The arrows illustrated below a nozzle 48 in FIG. 1 illustrate how the cooling unit 29 cools a release sheet 17.

Referring to FIG. 1, the device for automatically layering prepreg sheets 10 of the first embodiment includes the stage 11, a layered sheet winding roller 14, a first guide roller 21, a layered sheet feeding unit 23, a cutter 24, a first guide member 26, the second guide roller 28, the cooling unit 29 which is a temperature gradient formation unit, a compactor 31, a support member 33, a pressing roller 36, a second guide member 37, and a release sheet recovery roller 41.

The stage 11 is disposed on a base (not illustrated). The stage 11 is capable of moving in the A direction and the opposite direction to the A direction.

The stage 11 is a flat surface and has a layered body putting surface 11a on which the layered body 12 is put.

The layered body 12 is a layered body in which one or more semi-cured prepreg sheets are layered. The layered body 12 has the top surface 12a to which the semi-cured prepreg sheet 18 forming the layered sheet 16 is attached.

The layered body 12 is put on the stage 11 such that a bottom surface 12b of the layered body 12 comes into contact with the layered body putting surface 11a.

A layered sheet winding roller 14 is arranged upstream from the first guide roller 21. The layered sheet 16 is wound onto the layered sheet winding roller 14.

Here, description will be given of the configuration of the layered sheet 16. The layered sheet 16 includes the release sheet 17 and the semi-cured prepreg sheet 18. The release sheet 17 has one surface 17a to which the semi-cured prepreg sheet 18 is attached, and the other surface 17b which is on the opposite side to the one surface 17a and is pressed by the first roller 52 to be described below. For example, release paper can be used as the release sheet 17.

The prepreg sheet 18 has one surface 18a which faces the top surface 12a of the layered body 12, and the other surface 18b which is on the opposite side to the one surface 18a and is attached to the one surface 17a of the release sheet 17.

The prepreg sheet 18 includes a fiber sheet (not illustrated) and a semi-cured resin with which the fiber sheet is impregnated. For example, glass cloth, carbon fiber, or the like can be used as the fiber sheet.

As the resin forming the prepreg sheet 18, for example, it is possible to use a heat-curable resin, an ultraviolet-curable resin, or the like in a semi-cured state. As the heat-curable resin, it is possible to use, for example, acrylic resins, urea resins, melamine resins, phenol resins, epoxy resins, unsaturated polyesters, alkyd resins, urethane resins, ebonite, or the like.

The first guide roller 21 is arranged between the layered sheet winding roller 14 and the layered sheet feeding unit 23. The roller surface of the first guide roller 21 comes into contact with the one surface 18a of the prepreg sheet 18. The first guide roller 21 is a roller for guiding the layered sheet 16 drawn out from the layered sheet winding roller 14 between a first feeding roller 43 and a second feeding roller 44 to be described below.

The layered sheet feeding unit 23 is arranged between the first guide roller 21 and the cutter 24. The layered sheet feeding unit 23 includes a feeding unit main body 42, the first feeding roller 43, and the second feeding roller 44.

The feeding unit main body 42 incorporates a rotary driving unit which independently rotates the first and second feeding rollers 43 and 44. The feeding unit main body 42 rotatably supports the first and second feeding rollers 43 and 44.

The first feeding roller 43 is arranged directly below the layered sheet 16. The roller surface of the first feeding roller 43 comes into contact with the other surface 17b of the release sheet 17 forming the layered sheet 16.

The second feeding roller 44 is arranged directly above the layered sheet 16. The roller surface of the second feeding roller 44 comes into contact with the one surface 18a of the prepreg sheet 18 forming the layered sheet 16.

The layered sheet 16 drawn out from the layered sheet winding roller 14 is interposed between the first and second feeding rollers 43 and 44. In this state, the layered sheet 16 is fed in the B direction by the first and second feeding rollers 43 and 44 rotating in the direction illustrated by the arrows in FIG. 1. After that, the fed layered sheet 16 reaches a guide surface 26a of the first guide member 26.

The cutter 24 is arranged so as to be able to cut the layered sheet 16 located between the layered sheet feeding unit 23 and the first guide member 26. The cutter 24 cuts the layered sheet 16 to be inserted to a desired length.

The first guide member 26 is arranged downstream from the cutter 24. The first guide member 26 has the curved guide surface 26a. The first guide member 26 brings the other surface 17b of the release sheet 17 forming the layered sheet 16 fed by the layered sheet feeding unit 23 into contact with the guide surface 26a and reverses the top and bottom surfaces of the layered sheet 16 by guiding the layered sheet 16 along the curved guide surface 26a.

Due to this, in the feeding step carried out by the layered sheet feeding unit 23, the one surface 18a of the prepreg sheet 18 facing upward is made to face downward after passing through the first guide member 26. For this reason, the one surface 18a of the prepreg sheet 18 and the top surface 12a of the layered body 12 face each other.

The second guide roller 28 is arranged between the nozzle 48 forming the cooling unit 29 and the first guide member 26. The second guide roller 28 has a roller surface coming into contact with the other surface 17b of the release sheet 17 forming the layered sheet 16.

By coming into contact with the other surface 17b of the release sheet 17 forming the layered sheet 16, the second guide roller 28 guides the layered sheet 16 such that the one surface 18a of the prepreg sheet 18 forming the layered sheet 16 approaches the top surface 12a of the layered body 12.

The cooling unit 29 has a cooler 46, a pipe 47, and the nozzle 48. The cooler 46 is a device for generating cold air by cooling air.

One end of the pipe 47 is connected with the cooler 46 and the other end is connected with the nozzle 48. The pipe 47 is a line for transporting cold air by the cooler 46 to the nozzle 48.

The nozzle 48 is arranged above the release sheet 17 of the layered sheet 16 located in the first region C1. The nozzle 48 is arranged to be separated from the release sheet 17.

The nozzle 48 blows cold air to the release sheet 17 from the other surface 17b side of the release sheet 17 when the prepreg sheet 18 is attached to the top surface 12a of the layered body 12.

The cooling unit 29 configured as described above is arranged upstream from the first roller 52 which presses and layers the semi-cured prepreg sheet 18 on the top surface 12a of the layered body 12. The cooling unit 29 functions as a temperature gradient formation unit forming a temperature gradient (for example, a temperature gradient of approximately 1 to 2° C. with respect to a reference temperature) in which the temperature is lowered in a direction from the one surface 18a of the semi-cured prepreg sheet 18 layered on the top surface 12a of the layered body 12 toward the other surface 17b of the release sheet 17, in the first region C1 of the layered sheet 16.

In this manner, providing the cooling unit 29 which cools the release sheet 17 from the other surface 17b side of the release sheet 17 so as to form a temperature gradient (for example, a temperature gradient of approximately 1 to 2° C. with respect to a reference temperature) in which the temperature is lowered in the direction from the one surface 18a of the semi-cured prepreg sheet 18 layered on the top surface 12a of the layered body 12 toward the other surface 17b of the release sheet 17 in the layered sheet 16 located in the first region C1 arranged between the first roller 52 and the second guide roller 28 and upstream from the first roller 52 suppresses the decrease in the temperature on the one surface 18a side of the semi-cured prepreg sheet 18 and makes it possible to decrease the temperature in the vicinity of the interface between the other surface 18b of the semi-cured prepreg sheet 18 and the one surface 17a of the release sheet 17.

Due to this, in addition to suppressing a decrease in the adhesive force of the one surface 18a of the semi-cured prepreg sheet 18, the release sheet 17 can be easily peeled off from the semi-cured prepreg sheet 18.

Accordingly, it is possible to suppress the misalignment of the layered body 12 (in other words, of the semi-cured prepreg layered body under manufacturing) due to the poor releasability of the release sheet 17. This makes it possible to improve the productivity of the semi-cured prepreg layered body.

In addition, forming the above-described temperature gradient in a portion of the layered sheet 16 corresponding to the first region C1 makes it possible to further suppress the misalignment of the layered body 12 due to the poor releasability of the release sheet 17 in comparison with a case where, for example, the temperature gradient is formed in the layered sheet 16 by line contact using a roller.

The compactor 31 is capable of moving in the vertical direction (the up and down direction). The compactor 31 includes a compactor body 51, the first roller 52, and a second roller 53.

The compactor body 51 rotatably supports the first and second rollers 52 and 53 and incorporates a rotation driving unit (not illustrated) which independently rotates the first and second rollers 52 and 53.

The first roller 52 is arranged upstream from the installation position of the second roller 53. The first roller 52 is arranged so as to protrude downward from the lower end of the compactor body 51. Due to this, as illustrated in FIG. 1, when the compactor body 51 moves downward, the roller surface of the first roller 52 comes into contact with the other surface 17b of the release sheet 17 and presses the prepreg sheet 18 against the top surface 12a of the layered body 12 via the release sheet 17. At this time, the prepreg sheet 18 is layered on (attached to) the top surface 12a of the layered body 12 by moving the stage 11 in the A direction 12.

The second roller 53 is arranged downstream from the installation position of the first roller 52. The second roller 53 is a roller with a smaller diameter than the first roller 52.

The second roller 53 is arranged so as to not protrude from the lower end of the compactor body 51 and to allow the release sheet 17 to be guided in a direction in which the release sheet 17 is peeled off from the semi-cured prepreg sheet 18 layered on the top surface 12a of the layered body 12.

The second roller 53 is a roller for peeling off the release sheet 17 from the semi-cured prepreg sheet 18 layered on the top surface 12a of the layered body 12.

The support member 33 is arranged downstream from the compactor 31. The support member 33 is capable of moving in the up and down direction. A rotation driving unit (not illustrated) which rotates the pressing roller 36 is incorporated in the support member 33.

The pressing roller 36 is provided in the support member 33 so as to protrude from the lower end of the support member 33. The pressing roller 36 has a roller surface. The roller surface of the pressing roller 36 comes into contact with the other surface 18b of the semi-cured prepreg sheet 18 which has passed the first roller 52 and layered. The pressing roller 36 is a roller for pressing the prepreg sheet 18 against the layered body 12.

The second guide member 37 is provided on the upper end of the support member 33. The upper section of the second guide member 37 has a curved shape. The upper section of the second guide member 37 has a guide surface 37a which comes into contact with the one surface 17a of the release sheet 17 which has passed the second roller 53 and guides the release sheet 17 to a release sheet recovery roller 41.

The release sheet recovery roller 41 is arranged downstream from the second guide member 37. The release sheet recovery roller 41 is a roller for recovering the release sheet 17 by winding the release sheet 17 which has passed the second guide member 37.

The device for automatically layering prepreg sheets of the first embodiment includes the cooling unit 29 (a temperature gradient formation unit) which cools the release sheet 17 from the other surface 17b side of the release sheet 17 so as to form a temperature gradient (in which the temperature is lowered in the direction from the one surface 18a of the semi-cured prepreg sheet 18 layered on the top surface 12a of the layered body 12 toward the other surface 17b of the release sheet 17) in the first region C1 of the layered sheet 16 (the predetermined region in the first embodiment) which is located upstream from the first roller 52. Due to this, in addition to suppressing a decrease in temperature on the one surface 18a side of the semi-cured prepreg sheet 18, it is possible to decrease the temperature in the vicinity of the interface between the other surface 18b of the semi-cured prepreg sheet 18 and the one surface 17a of the release sheet 17.

Due to this, in addition to suppressing a decrease in the adhesive force of the one surface 18a of the semi-cured prepreg sheet 18, the release sheet 17 can be easily peeled off from the semi-cured prepreg sheet 18.

Accordingly, the productivity of the semi-cured prepreg layered body can be improved since it is possible to suppress the misalignment of the layered body 12 (in other words, of the semi-cured prepreg layered body under manufacturing) due to the poor releasability of the release sheet 17.

In addition, forming the above-described temperature gradient in the layered sheet 16 corresponding to the first region C1 makes it possible to further suppress the misalignment of the layered body 12 due to the poor releasability of the release sheet 17 in comparison with a case where, for example, the temperature gradient is formed in the layered sheet 16 by line contact using a roller.

Here, in the first embodiment, as an example of the cooling unit 29, description has been given of a case where the first region C1 is cooled using cold air; however, it is sufficient if the cooling unit 29 is able to form a temperature gradient in which the temperature is lowered in the direction from the one surface 18a of the semi-cured prepreg sheet 18 toward the other surface 17b of the release sheet 17, and the cooling unit 29 is not limited to the configuration illustrated in FIG. 1.

Next, with reference to FIG. 1, description will be given of a method for layering prepreg sheets using the device for automatically layering prepreg sheets 10 of the first embodiment.

Firstly, the layered body 12 is put on the layered body putting surface 11a of the stage 11. At this time, the layered body 12 is arranged such that the layered body putting surface 11a comes into contact with the bottom surface 12b of the layered body 12.

Next, the layered sheet 16 wound by the layered sheet winding roller 14 is fed in the B direction by the layered sheet feeding unit 23. The fed layered sheet 16 is guided to the guide surface 26a of the first guide member 26 so that the one surface 18a of the prepreg sheet 18 faces the top surface 12a of the layered body 12.

Next, a temperature gradient is formed in the first region C1 of the layered sheet 16 located upstream from the first roller 52 such that the temperature is lowered in the direction from the one surface 18a of the semi-cured prepreg sheet 18 layered on the top surface 12a of the layered body 12 toward the other surface 17b of the release sheet 17 (a temperature gradient formation step).

Specifically, the release sheet 17 located in the first region C1 is cooled by blowing cold air to the release sheet 17 from the other surface 17b side of the release sheet 17, and a temperature gradient is formed in which the temperature is lowered in the direction from the one surface 18a of the semi-cured prepreg sheet 18 layered on the top surface 12a of the layered body 12 toward the other surface 17b of the release sheet 17.

After that, the layered sheet 16 including the cooled release sheet 17 is fed between the roller surface of the first roller 52 and the top surface 12a of the layered body 12.

Next, by pressing the other surface 17b of the release sheet 17 of the layered sheet 16 using the first roller 52, the semi-cured prepreg sheet 18 forming the layered sheet 16 is layered on the top surface 12a of the layered body 12 formed of one or more layers of semi-cured prepreg sheets (layering step).

Next, the release sheet 17 is peeled off from the semi-cured prepreg sheet 18 layered on the top surface 12a of the layered body 12 using the second roller 53 arranged downstream from the first roller 52 (peeling step).

At this time, as described above, in a portion of the layered sheet 16 layered by the first roller 52, a temperature gradient has been formed in which the temperature is lowered in the direction from the one surface 18a of the semi-cured prepreg sheet 18 layered on the top surface 12a of the layered body 12 toward the other surface 17b of the release sheet 17. Due to this, in addition to suppressing a decrease in temperature on the one surface 18a side of the semi-cured prepreg sheet 18, it is possible to decrease the temperature in the vicinity of the interface between the other surface 18b of the semi-cured prepreg sheet 18 and the one surface 17a of the release sheet 17.

Due to this, in addition to suppressing a decrease in the adhesive force of the one surface 18a of the semi-cured prepreg sheet 18, the release sheet 17 can be easily peeled off from the semi-cured prepreg sheet 18.

Accordingly, the productivity of the semi-cured prepreg layered body can be improved since it is possible to suppress the misalignment of the layered body 12 (in other words, of the semi-cured prepreg layered body under manufacturing) due to difficulty in peeling off the release sheet 17.

In addition, forming the above-described temperature gradient in the layered sheet 16 corresponding to the first region C1 makes it possible to further suppress the misalignment of the layered body 12 due to difficulty in peeling off the release sheet 16 in comparison with a case where, for example, a temperature gradient is formed in the layered sheet 16 by line contact using a roller.

After that, the layered sheet 16 is cut by the cutter 24 to a desired length (the same length as the layered body 12) and the semi-cured prepreg sheet 18 is layered so as to cover the top surface 12a of the layered body 12.

By repeating the above-described steps, a semi-cured prepreg layered body including the layered body 12 and at least one semi-cured prepreg sheet 18 layered on the layered body 12 is manufactured.

After that, a completely cured prepreg layered body is manufactured by completely curing the prepreg sheets forming the semi-cured prepreg layered body.

The method for layering prepreg sheets of the first embodiment includes, before the layering step of layering the semi-cured prepreg sheet 18 forming the layered sheet 16 on the top surface 12a of the layered body 12 formed of one or more layers of semi-cured prepreg sheets, a temperature gradient formation step of forming a temperature gradient in which the temperature is lowered in the direction from the one surface 18a of the semi-cured prepreg sheet 18 layered on the top surface 12a of the layered body 12 toward the other surface 17b of the release sheet 17 in the first region C1 of the layered sheet 16 located upstream from the first roller 52. Due to this, in addition to suppressing a decrease in temperature on the one surface 18a side of the semi-cured prepreg sheet 18, it is possible to decrease the temperature in the vicinity of the interface between the other surface 18b of the semi-cured prepreg sheet 18 and the one surface 17a of the release sheet 17.

Due to this, in addition to suppressing a decrease in the adhesive force of the one surface 18a of the semi-cured prepreg sheet 18, the release sheet 17 can be easily peeled off from the semi-cured prepreg sheet 18.

Accordingly, the productivity of the semi-cured prepreg layered body can be improved since it is possible to suppress the misalignment of the layered body 12 (in other words, of the semi-cured prepreg layered body under manufacturing) due to the poor releasability of the release sheet 17.

In addition, forming the above-described temperature gradient in a portion of the layered sheet 16 corresponding to the first region C1 makes it possible to further suppress the misalignment of the layered body 12 due to the poor releasability of the release sheet 17 in comparison with a case where, for example, the temperature gradient is formed in the layered sheet 16 by line contact using a roller.

Second Embodiment

Figure 2:
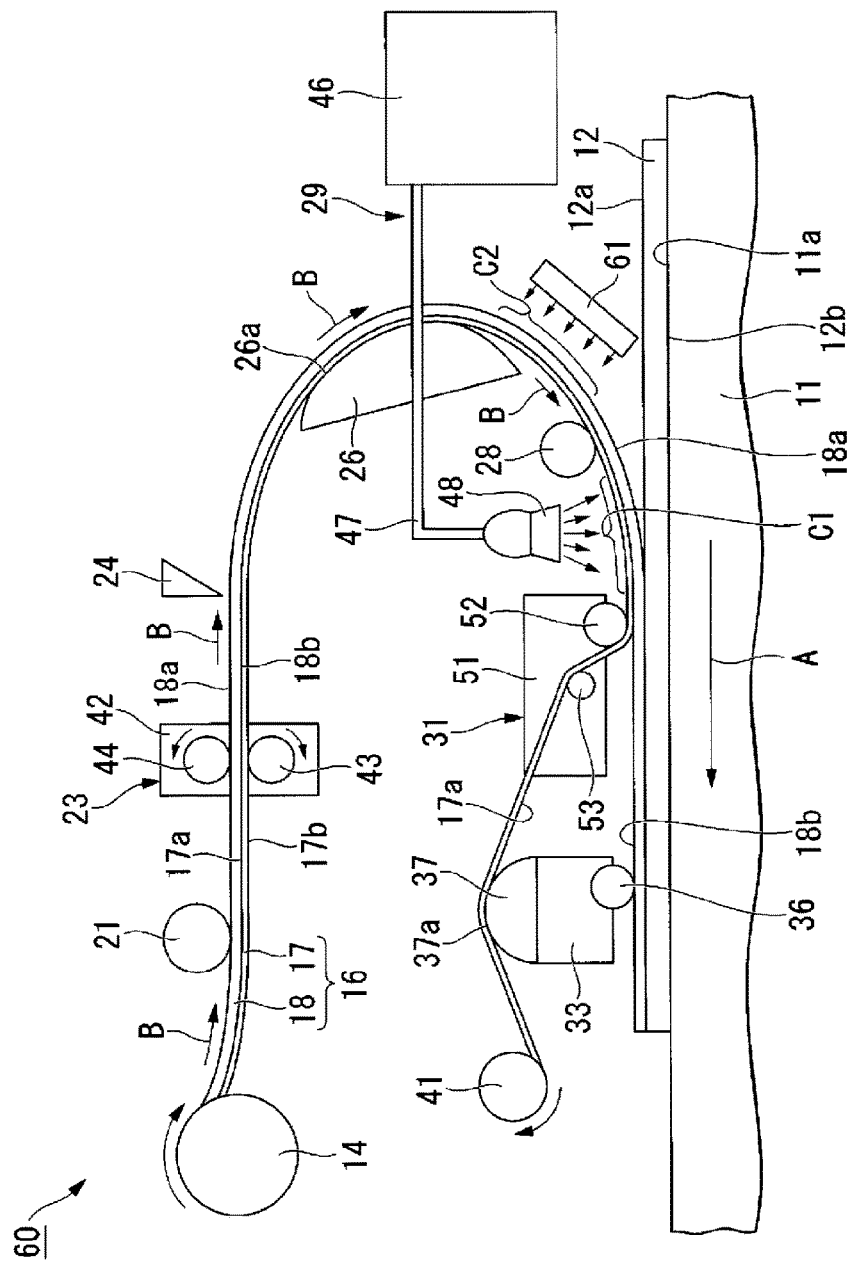
FIG. 2 is a diagram schematically illustrating an outline configuration of a device for automatically layering prepreg sheets according to a second embodiment of the present invention.

FIG. 2 is a diagram schematically illustrating an outline configuration of a device for automatically layering prepreg sheets according to a second embodiment of the present invention. In FIG. 2, the same reference numerals are used for constituent components which are the same as in the device for automatically layering prepreg sheets 10 of the first embodiment illustrated in FIG. 1.

In FIG. 2, the arrows illustrated between a first heating unit 61 and the prepreg sheet 18 illustrate how the first heating unit 61 heats the prepreg sheet 18.

With reference to FIG. 2, a device for automatically layering prepreg sheets 60 of the second embodiment has the same configuration as the device for automatically layering prepreg sheets 10 of the first embodiment except that, the first heating unit 61 is further included in the device for automatically layering prepreg sheets 10.

The second region C2 illustrated in FIG. 2 is a part of the predetermined region and illustrates a region (upstream from the first region C1) between the first guide member 26 and the second guide roller 28.

That is, the predetermined region of the second embodiment is formed of the first and second regions C1 and C2 which are different.

The first heating unit 61 is arranged so as to face the one surface 18a of the semi-cured prepreg sheet 18 located in the second region. The first heating unit 61 is arranged to be separated from the one surface 18a of the prepreg sheet 18.

Due to this, the first heating unit 61 heats the semi-cured prepreg sheet 18 indirectly from the one surface 18a side of the semi-cured prepreg sheet 18. For example, a heater can be used as the first heating unit 61.

The device for automatically layering prepreg sheets of the second embodiment includes the first heating unit 61 which heats the semi-cured prepreg sheet 18 from the one surface 18a side of the semi-cured prepreg sheet 18 located in the second region C2 arranged upstream from the first region C1. Due to this, it is possible to form a temperature gradient (for example, a temperature gradient of approximately 1 to 2° C. with respect to a reference temperature) in which the temperature is lowered in the direction from the one surface 18a of the semi-cured prepreg sheet 18 toward the other surface 17b of the release sheet 17.

In addition, in addition to forming the temperature gradient in which the temperature is lowered in a direction from the one surface 18a of the semi-cured prepreg sheet 18 toward the other surface 17b of the release sheet 17, having the cooling unit 29 and the first heating unit 61 makes it possible to improve the adhesion between the top surface 12a of the layered body 12 and the one surface 18a of the semi-cured prepreg sheet 18.

The method for layering prepreg sheets of the second embodiment using the device for automatically layering prepreg sheets 60 configured as described above is the same as the method for layering prepreg sheets of the first embodiment except that, in the temperature gradient formation step, the semi-cured prepreg sheet 18 is heated from the one surface 18a side of the semi-cured prepreg sheet 18 located in the second region C2.

Here, in the second embodiment, description has been given of a case where the first region C1 and the second region C2 are different as an example; however, the first heating unit 61 may be arranged so as to heat the prepreg sheet 18 located on the opposite side to the release sheet 17 cooled by the cooling unit 29 (in other words, so that the first region C1 and the second region C2 match).

Even in this case, it is possible to obtain the same effects as the device for automatically layering prepreg sheets 60 of the second embodiment.

Third Embodiment

Figure 3:
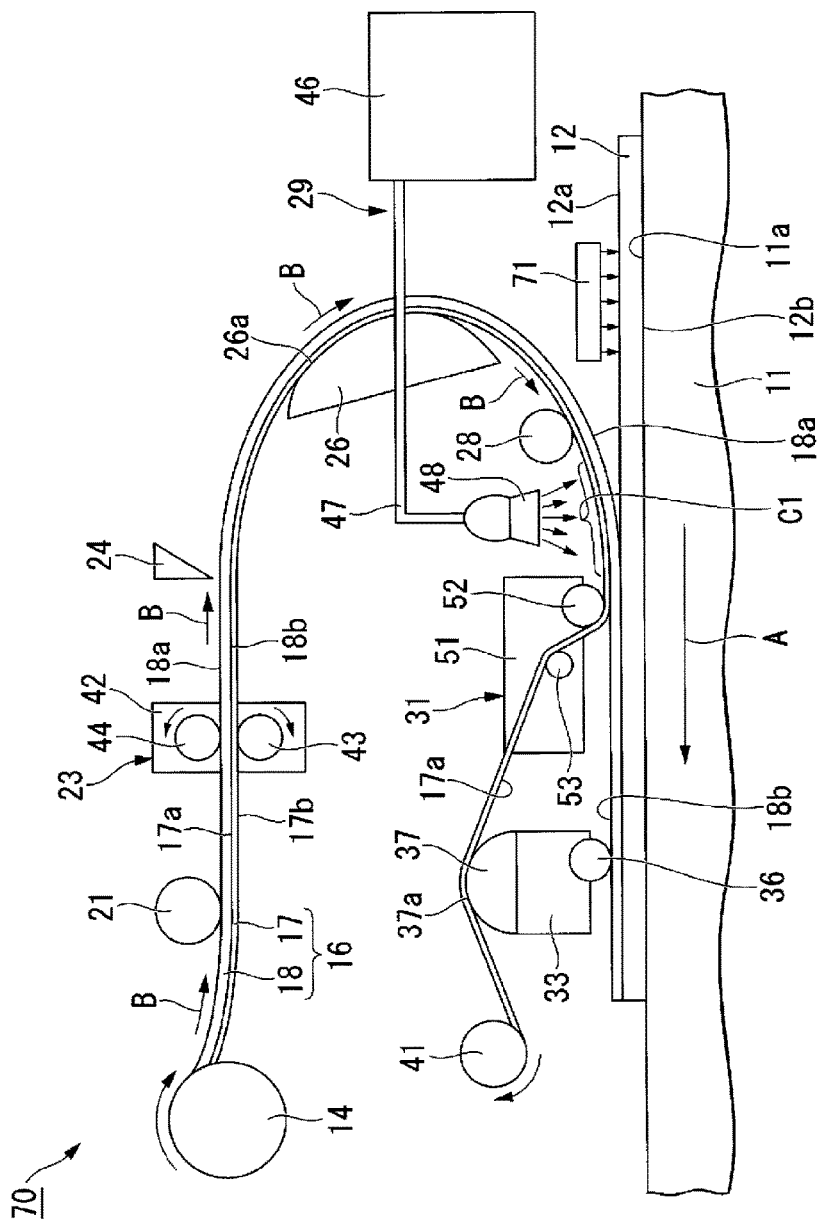
FIG. 3 is a diagram schematically illustrating an outline configuration of a device for automatically layering prepreg sheets according to a third embodiment of the present invention.

FIG. 3 is a diagram schematically illustrating an outline configuration of a device for automatically layering prepreg sheets according to a third embodiment of the present invention. In FIG. 3, the same reference numerals are used for constituent components which are the same as in the device for automatically layering prepreg sheets 10 of the first embodiment illustrated in FIG. 1.

In FIG. 3, the arrows illustrated between a second heating unit 71 and the layered body 12 illustrate how the second heating unit 71 heats the layered body 12.

With reference to FIG. 3, the device for automatically layering prepreg sheets 70 of the third embodiment has the same configuration as the device for automatically layering prepreg sheets 10 of the first embodiment except that the second heating unit 71 is further included in the device for automatically layering prepreg sheets 10 of the first embodiment.

The second heating unit 71 is arranged facing the top surface 12a of the layered body 12 so as to be able to heat the layered body 12 located upstream from the first roller 52. The second heating unit 71 is arranged to be separated from the top surface 12a of the layered body 12.

Due to this, the second heating unit 71 heats the layered body 12 indirectly from the top surface 12a side of the layered body 12. For example, a heater can be used as the second heating unit 71.

According to the device for automatically layering prepreg sheets of the third embodiment, providing the second heating unit 71 which heats the layered body 12 located upstream from the first roller 52 makes it possible to improve the adhesion between the top surface 12a of the layered body 12 and the one surface 18a of the semi-cured prepreg sheet 18.

In addition, the device for automatically layering prepreg sheets 70 of the third embodiment configured as described above can obtain the same effects as the device for automatically layering prepreg sheets 10 of the first embodiment.

The method for layering prepreg sheets of third embodiment using the device for automatically layering prepreg sheets 70 configured as described above is the same as the method for layering prepreg sheets of the first embodiment except that, in the temperature gradient formation step, the layered body 12 located upstream from the first roller 52 is heated.

Here, the device for automatically layering prepreg sheets 70 of the third embodiment may include the first heating unit 61 described in the second embodiment.

INDUSTRIAL APPLICABILITY

The present invention can be applied to a device for automatically layering prepreg sheets and a method for layering prepreg sheets which form a prepreg layered body by layering a plurality of semi-cured prepreg sheets, each of the semi-cured prepreg sheets being formed of a fiber sheet impregnated with resin.

REFERENCE SIGNS LIST

10, 60, 70 Device for automatically layering prepreg sheets
11 Stage
11a Layered body putting surface
12 Layered body
12a Top surface
12b Bottom surface
14 Layered sheet winding roller
16 Layered sheet
17 Release sheet
17a, 18a One surface
17b, 18b Other surface
18 Prepreg sheet
21 First guide roller
23 Layered sheet feeding unit
24 Cutter
26 First guide member
26a, 37a Guide surface
28 Second guide roller
29 Cooling unit
31 Compactor
33 Support member
36 Pressing roller
37 Second guide member
41 Release sheet recovery roller
42 Feeding unit main body
43 First feeding roller
44 Second feeding roller
46 Cooler
47 Pipe
48 Nozzle
51 Compactor body
52 First roller
53 Second roller
61 First heating unit 71 Second heating unit
A Direction
B Feeding direction
C1 First region
C2 Second region

The invention claimed is:

1. A device for automatically layering prepreg sheets, the device forming a prepreg layered body by layering a plurality of semi-cured prepreg sheets, each of the plurality of semi-cured prepreg sheets being formed of a fiber sheet impregnated with resin, the device comprising:
   a first roller configured to press on a top surface of a layered sheet to attach at least one layer of semi-cured prepreg sheet to a top surface of the layered body, wherein the layered sheet comprising a release sheet forming a top layer of the layered sheet and the at least one layer of semi-cured prepreg sheet attached to a bottom surface of the release sheet forming a bottom layer of the layered sheet, the at least one layer of the semi-cured prepreg sheet layered onto the layered body such that a bottom surface of the semi-cured prepreg sheet is in contact with the top surface of the layered body;
   a second roller arranged downstream of the first roller and configured to guide the release sheet so as to peel off the release sheet from the semi-cured prepreg sheet layered on the top surface of the layered body; and
   a cooling unit arranged upstream of the first roller so as to face the release sheet included in the layered sheet and configured to cool the layered sheet to be fed to the first roller, wherein a temperature gradient is formed in the layered sheet such that a temperature is lowered as close to the bottom surface of the release sheet from the a top surface of the semi-cured prepreg sheet.

2. The device for automatically layering prepreg sheets according to claim 1, wherein the cooling unit blows cold air to a top surface of the release sheet located.

3. The device for automatically layering prepreg sheets according to claim 2, further comprising:
   a first heating unit arranged upstream of the cooling unit so as to face the bottom surface of the semi-cured prepreg sheet and configured to heat the semi-cured prepreg sheet included in the layered sheet to be fed to the first roller.

4. The device for automatically layering prepreg sheets according to claim 2, further comprising:
   a first heating unit arranged upstream of the first roller so as to face the top surface of the layered body and configured to heat the layered body to be fed to the first roller.

5. The device for automatically layering prepreg sheets according to claim 1, further comprising:
   a first heating unit arranged upstream of the cooling unit so as to face the bottom surface of the semi-cured prepreg sheet and configured to heat the semi-cured prepreg sheet included in the layered sheet to be fed to the first roller.

6. The device for automatically layering prepreg sheets according to claim 5, further comprising:
   a second heating unit arranged upstream of the first roller so as to face the top surface of the layered body and configured to heat the layered body to be fed to the first roller.

7. The device for automatically layering prepreg sheets according to claim 1, further comprising:
   a second heating unit arranged upstream of the first roller so as to face the top surface of the layered body and configured to heat the layered body to be fed to the first roller.

8. A method for layering prepreg sheets in which a prepreg layered body is formed by layering a plurality of semi-cured prepreg sheets, each of the plurality of semi-cured prepreg sheets being formed of a fiber sheet impregnated with resin, the method comprising:
   a layering step of pressing a top surface of a layered sheet to a top surface of a layered body using a first roller, wherein the layered sheet includes a release sheet forming a top layer of the layered sheet and at least one semi-cured prepreg sheet attached to the bottom surface of the release sheet, wherein the at least one semi-cured prepreg sheet being layered on the layered body such that a bottom surface of the semi-cured prepreg sheet is in contact with the top surface of the layered body;
   a peeling-off step of peeling off the release sheet from the semi-cured prepreg sheet layered on the top surface of the layered body with a second roller arranged downstream of the first roller after the layering step; and
   a temperature gradient formation step of cooling the layered sheet to be fed to the first roller using a cooling unit arranged upstream of the first roller so as to face a top surface of the release sheet included in the layered sheet, wherein a temperature gradient is formed in the layered sheet such that a temperature is lowered as close to the bottom surface of the release sheet from a top surface of the semi-cured prepreg sheet before the layering step.

9. The method for layering prepreg sheets according to claim 8, wherein, in the temperature gradient formation step, cold air is blown to the top surface of the release sheet by the cooling unit.

10. The method for layering prepreg sheets according to claim 8, wherein, in the temperature gradient formation step, the semi-cured prepreg sheet is heated using a first heating unit arranged upstream of the cooling unit so as to face the a bottom surface of the semi-cured prepreg sheet.

11. The method for layering prepreg sheets according to claim 8, wherein, in the temperature gradient formation step, the layered body is heated using a first heating unit arranged upstream of the first roller so as to face the top surface of the layered body.

* * * * *